(No Model.)

W. CURRAN.
JOURNAL BEARING.

No. 484,143. Patented Oct. 11, 1892.

Witnesses:
Fred Gerlach
Otto Luebkert

Inventor:
William Curran
By Wm H Lotz
Attorney.

UNITED STATES PATENT OFFICE.

WILLIAM CURRAN, OF CHICAGO, ILLINOIS, ASSIGNOR OF FOUR-FIFTHS TO RASMUS BERTELSEN, HERMAN LORENZ, FREDERICK ROEHL AND A. C. CLOVER, ALL OF SAME PLACE.

JOURNAL-BEARING.

SPECIFICATION forming part of Letters Patent No. 484,143, dated October 11, 1892.

Application filed December 10, 1890. Serial No. 374,239. (No model.)

*To all whom it may concern:*

Be it known that I, WILLIAM CURRAN, a citizen of the United States of America, residing at Chicago, in the county of Cook and State of Illinois, have invented certain new and useful Improvements in Journal-Bearings, of which the following is a specification, reference being had therein to the accompanying drawings.

This my invention relates to bearings adaptable for all sorts of journal-boxes or pillow-blocks, but more particularly intended for car-axle boxes; and it has for its object to so construct the journal-bearings or the linings of such journal-bearings that by its shape and by the rotation of the journal the bulk of the lubricant adhering thereto will be directed toward the center of the bearing; that suitable pockets or retainers for properly subdividing the lubricant will be provided, and that the bearing-surface, according to the friction and weight to be sustained, will be proportionally distributed; and with these objects in view my invention consists of the novel devices and combinations of devices, hereinafter described and specifically claimed.

Figure 1:
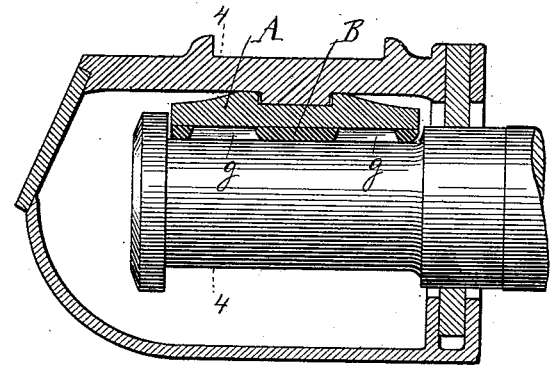
Figure 2:
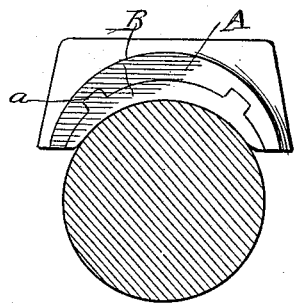
Figure 3:
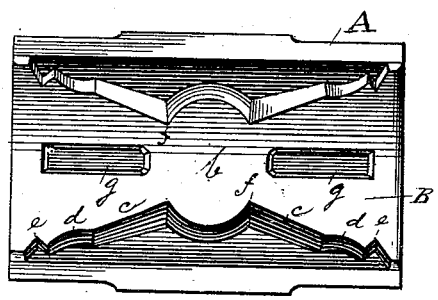
Figure 4:
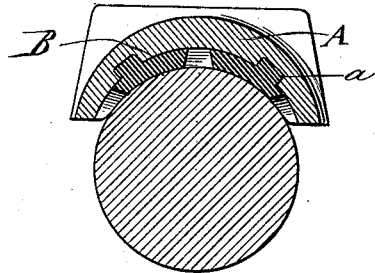

In the accompanying drawings, Figure 1 represents a longitudinal vertical section of an axle-box having my improvements; Fig. 2, an end view of the journal-bearing; Fig. 3, a bottom face view of the same, showing the bearing-surface; and Fig. 4 is a cross-section of the journal-bearing on line 4 4 in Fig. 1.

Corresponding letters of reference in the several figures of the drawings designate like parts.

A represents the brass or shell of the journal-bearing, of the usual segmental shape, with a central square seat or supporting-surface for the axle-box, and $a$ are sockets formed therein for providing a rigid hold for the lining B, that in a molten condition is poured into the proper mold fitted to said shell. The journal-bearing or lining B, being narrow in the middle, tapers or increases in width or bearing-surface toward both ends, where it covers the entire segmental surface of shell A. As a further and separate improvement, the central narrow portion $b$ of the lining is segmentally bulged on its edges, whence the edges $c$ of the lining extend toward the ends or corners of the box in angular directions on straight inclined lines about one-half their distance from their starting-corners toward the ends of the shell A. Thence in each edge is formed a shallow concave $d$, and beyond this and adjoining the ends of the lining is formed in each edge an angular notch $e$.

For the purpose of illustrating and explaining my invention the term "central portion" is employed in the specification and claims to designate that portion of the journal-bearing between the inner ends of the straight inclined edges thereof, and to further distinguish and point out such central portion I describe it as a narrow or contracted central portion, because it is narrower than the end portions of the bearing, and thereby make a distinction between the ends of the bearing, which are expanded or widened relatively to the central portion by reason of the diverging sides of the bearing. Segmentally bulging the narrow or contracted central portion of the bearing forms a further and separate improvement, and it will be understood that, except in the claims for the particular construction, I contemplate making said narrow or contracted central portion of the bearing either straight, bulged, or other shape, so long as it remains narrow or contracted with relation to the widened or expanded end portions of the bearings. It is obvious that the central portion is bulged only slightly and does not affect its relation to the end portions as to the condition of its narrowness and the relative wideness of said end portions. The tendency of the rotating journal being to push the lubricant toward the ends of the journal and there by centrifugal force to scatter it, the angular notches $e$ will catch and hold the lubricant, whence after these notches are filled the bulk of the lubricant thus collecting will fill the concavities $d$, whence by the angularity of the straight edges the lubricant will be directed toward the center of the lining B, filling the corners $f$, formed by the convex edges of the middle portion $b$ of the lining.

It will thus be readily seen the lubricant is continually moved to the center, thereby preventing the journal from becoming dry and from being heated, while at the same time the ends of the bearings are fed with the lubricant from the notches $e$ and concavities $d$ and a scattering of the lubricant at and through the ends and cover of the axle-box is almost entirely prevented, whereby not only a large amount of lubricating material is saved from being wasted, but also the heating of the journal-bearings is obviated.

In the central face of the lining B, I also form longitudinally-rectangular pockets or recesses g, providing chambers for a portion of the lubricant to collect in and to assist in distributing the same over the entire bearing-surface of the lining. These pockets or recesses g, as will be noticed, do not extend to the ends of the shell A or lining B, so that the lubricant captured in these pockets is held from being scattered or wasted.

Any suitable composition known as "anti-friction metal"—such as "Babbitt metal" or "nonpareil"—may be used for the lining B.

Having thus described my invention, what I claim is—

1. A journal-bearing having a short and narrow or contracted portion substantially midway between its ends and diverging sides or edges extending from said narrow or contracted portion toward the outer ends of the bearing to form expanded or widened end portions.

2. A journal-bearing having a short and narrow or contracted portion substantially midway between its ends and diverging sides or edges extending from said narrow or contracted portion toward the outer ends of the bearing to form expanded or widened end portions, said diverging sides or edges being provided with notches adjacent their outer ends.

3. A journal-bearing having a short and narrow or contracted portion substantially midway between its ends and diverging sides or edges extending from said narrow or contracted portion toward the outer ends of the bearing to form expanded or widened end portions, said narrow or contracted portion being wider at its center than at its ends.

In testimony whereof I affix my signature in presence of two witnesses.

WILLIAM CURRAN.

Witnesses:
WILLIAM H. LOTZ,
OTTO LUEBKERT.